UNITED STATES PATENT OFFICE.

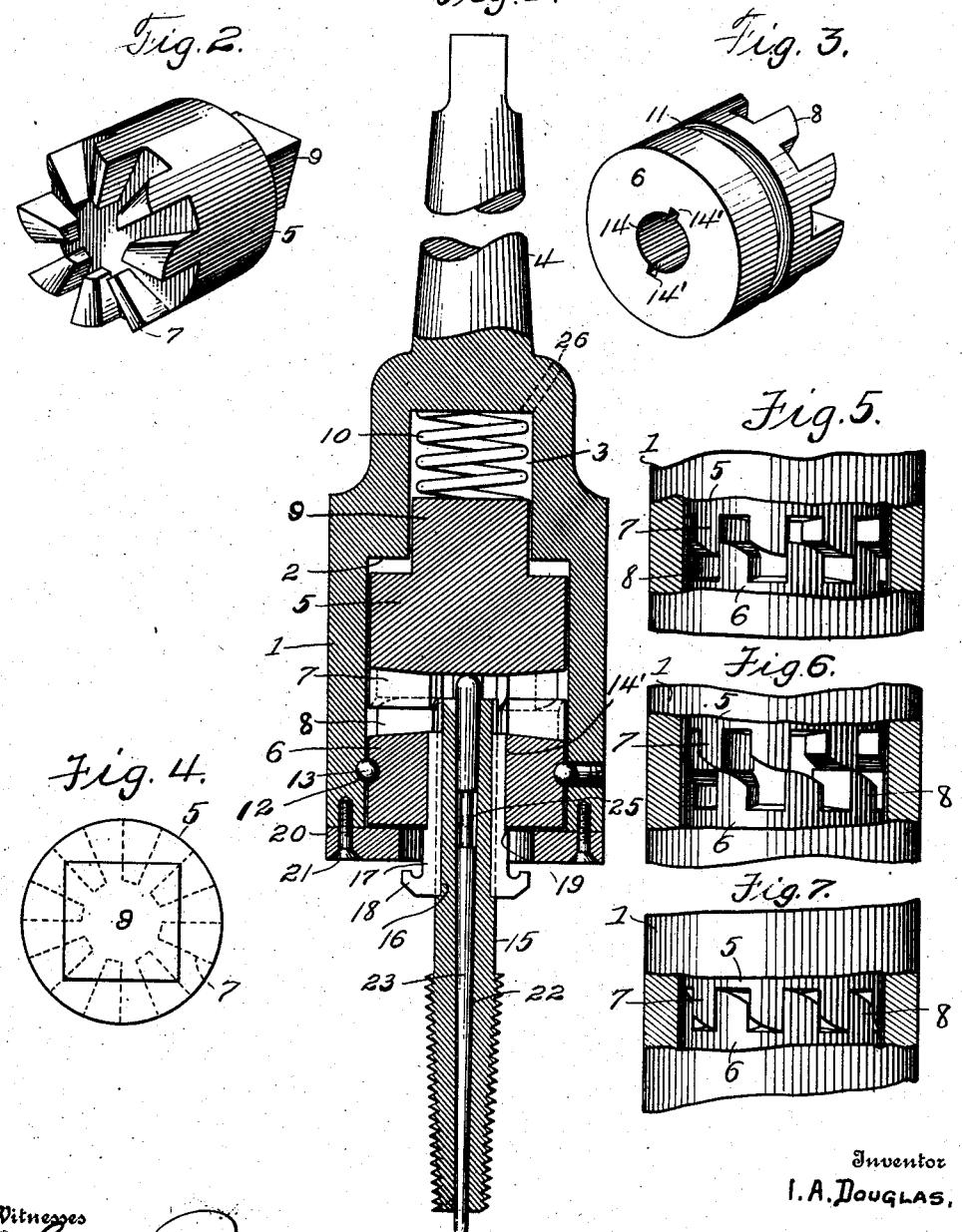

IRA A. DOUGLAS, OF SWISSVALE, PENNSYLVANIA.

AUTOMATIC TAP-HEAD.

No. 915,568.  Specification of Letters Patent.  Patented March 16, 1909.

Application filed September 13, 1906. Serial No. 334,538.

*To all whom it may concern:*

Be it known that I, IRA A. DOUGLAS, a citizen of the United States of America, residing at Swissvale, in the county of Allegheny and State of Pennsylvania, have invented certain new and useful Improvements in Automatic Tap Head, of which the following is a specification, reference being had therein to the accompanying drawing.

This invention relates to an automatic tap head, and its primary object is to provide simple and effective means for automatically arresting the revolution of a machine-operated tap when the tap reaches a predetermined point, as the bottom of the hole to be tapped.

A further object of the invention is to provide means whereby a hole may be tapped entirely by a machine driven chuck and tap, as distinguished from starting the work of tapping by a machine-driven tool, and completing it by hand, as is the general custom.

The invention comprises a chuck of improved construction in combination with a hollow tap, a pin extending longitudinally through the tap, and separable clutch sections within the chuck.

The invention also includes various detail features of construction and combinations of parts as hereinafter fully described in connection with the accompanying drawing which forms a part of this application, and defined in the appended claim.

Figure 1 is a longitudinal sectional elevation of the improved implement. Fig. 2 is a perspective view of the upper clutch section. Fig. 3 is a perspective view of the lower clutch section. Fig. 4 is a plan view of the upper clutch section. Fig. 5 is a detail side elevation partly broken away and partly in section, showing the clutch members partially disengaged, or in the position they occupy when the upper clutch member is elevated by the clutch elevating pin. Fig. 6 is a similar view showing the clutch members wholly disengaged, and Fig. 7 is a view of the same character showing the clutch members in full engagement.

The reference numeral 1 designates a hollow cylindrical body or stock formed with an internal annular shoulder 2, a squared socket 3 and an internal shank or stem 4, having means for connection to the drill press or other operating means.

Within the body or stock 1 are supported two separable clutch members 5 and 6 the confronting faces of which are formed respectively with interlocking radial clutch teeth 7 and 8. The upper clutch member 5 is formed with a square head 9 fitting within the socket 3 of the stock, a coil spring 10 being interposed between the upper end of said head, and the top wall of the socket 3. The lower clutch member 6 is formed with an annular peripheral groove 11 registering with a corresponding annular groove 12 in the inner surface of the stock, said grooves forming a race-way for anti-friction balls 13. The lower clutch member 6 is also formed with a central bore 14, through which extends the stem of a tap 15 formed for a portion of its length with diametrically opposite longitudinal grooves 16 serving as key seats to receive keys 17 having hook-shaped heads 18, and oppositely disposed shoulders 19. These keys also engage in longitudinal grooves 14' in the lower clutch member and thus connect the tap with the lower clutch member 6, and a washer plate 20 secured by screws 21 is secured to the lower end of the stock, to support the clutch member 6 within the stock.

The tap 15 is formed with a tapered bore 22 extending throughout its length to receive a correspondingly tapered clutch elevating pin 23 projecting slightly beyond the tap at both ends, and having a circumferential recess 24 adjacent to its upper end to receive a dowel pin 25 extending through one side of the tap to retain the pin therein. The stock is provided with an oil hole 26 to facilitate lubrication.

The utility and operation of the device constructed as thus described will be readily understood. The two clutch-faced members 5 and 6 are shown in their separated positions in the drawing, the clutch member 5 having been elevated by the raising of the pin 23. When the two clutch members are in their interlocked position the revolution of the stock and upper clutch member 5, revolves the lower clutch member 6 and the tap 15 keyed thereon. When the tap reaches the bottom of the hole, the lower end of the pin 23 contacts or engages with the bottom of the hole, and the pin is forced upwardly, and, its upper end engaging with the clutch member 5, forces this clutch member upwardly against the tension of the spring 10, to the position shown in Fig. 1 of the drawings. In this position of the clutch members, it will be observed that the teeth of the members 5 and 6 are so positioned or disposed with relation to each other that if further downward or driving movement be imparted to the body 1, the teeth of the member 5 will ride over the teeth of the member 6 without imparting any movement to said member 6. This is due to the fact that where these teeth are positioned as shown in Fig. 1 and the body 1 is rotating in the direction to effect driving movement, the curved or inclined faces of the teeth on member 5 are disposed opposite the similar faces on the teeth of member 6, (see Fig. 5) and, consequently, the teeth on member 5 will simply ride up on the inclined faces of the teeth on member 6 as the parts 1, 4 and 5 rotate, without effecting any driving of member 6. However, in this same position of the members 5 and 6 it will be observed that the straight or vertical faces or edges of the teeth are in overlapping engagement sufficiently to effect a clutching engagement between the members 5 and 6 when the parts 1, 4 and 5 are turned in the reverse direction, (see Fig. 5). As the movement of the parts 1, 4 and 5 in the reverse direction continues, it will be obvious that the pin 23 will be permitted to drop in proportion as the tap is unscrewed from the hole, and that, after the first one or two turns of the body with the teeth only partially engaged as above described, that the spring 10 exerting its tension against the member 5, will be forcing the latter downward to effect a full engagement between the teeth of member 5 and those of member 6. This full engagement of the teeth will be obtained it will be observed, just as soon as the tap has been unscrewed sufficiently to allow the pin 23 to descend. As a result of this construction it is to be noted that upon the top being unscrewed from the hole, the teeth of the members 5 and 6 being fully engaged, the device is in condition for the tapping of another hole without the requirement of any adjustment. It will be noted that this disengagement of the clutch-faced members is automatically accomplished, the spring 10 permitting the upper clutch-member 5 to yield, and serving to reëngage the two clutch-members when the pin 23 is released.

The improvement is designed to render tapping by hand unnecessary, since by its use the motion of the machine driven tap may be stopped at any predetermined point without liability of injury to the tap.

What I claim and desire to secure by Letters Patent, is:—

In a device of the class described, a tubular body having an annular member partly closing one end and extended at the other end into a shank adapted to be engaged by the operating means and with a squared socket communicating with the interior of the body and with an annular internal channel near one end, a clutch member slidable within said body and provided at one end with a squared portion extending into said squared socket and with radial clutch teeth at the other end, a clutch member rotatively disposed within said body between said annular closure and the slidable clutch member and provided with a central longitudinal bore and with an annular channel registering with the annular channel of the body, said rotative clutch member provided with radial teeth adapted to engage with the teeth of said slidable clutch member, bearing balls within said registering annular channels, a tap connected for rotation with said rotative clutch member and having a central tapered bore, and a tapered pin fitting said bore and extending at one end beyond the threaded end of the tap and extending at the other end for engagement with the slidable clutch member.

In testimony whereof I affix my signature in the presence of two witnesses.

IRA A. DOUGLAS.

Witnesses:
MAX H. SROLOVITZ,
A. J. TRIGG.